United States Patent
Wu et al.

(10) Patent No.: US 11,857,937 B2
(45) Date of Patent: Jan. 2, 2024

(54) ANISOTROPIC LAMELLAR INORGANIC FIBER AEROGEL MATERIALS AND PREPARATION METHOD THEREOF

(71) Applicant: Tsinghua University, Beijing (CN)

(72) Inventors: Hui Wu, Beijing (CN); Chao Jia, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 553 days.

(21) Appl. No.: 16/980,376

(22) PCT Filed: Apr. 21, 2020

(86) PCT No.: PCT/CN2020/085976
§ 371 (c)(1),
(2) Date: Sep. 11, 2020

(87) PCT Pub. No.: WO2020/224429
PCT Pub. Date: Nov. 12, 2020

(65) Prior Publication Data
US 2021/0213411 A1    Jul. 15, 2021

(30) Foreign Application Priority Data
May 7, 2019    (CN) .......................... 201910376244.2

(51) Int. Cl.
*D01D 10/02*    (2006.01)
*C01B 33/26*    (2006.01)
(Continued)

(52) U.S. Cl.
CPC .......... *B01J 13/0091* (2013.01); *C01B 33/20* (2013.01); *C01B 33/26* (2013.01); *C01G 25/006* (2013.01);
(Continued)

(58) Field of Classification Search
None
See application file for complete search history.

(56) References Cited

U.S. PATENT DOCUMENTS 4,157,424 A * 6/1979 Boutle ................. D06N 3/0052
521/61
5,935,895 A * 8/1999 Baiker ................. C07D 303/04
501/12
(Continued)

FOREIGN PATENT DOCUMENTS

| CN | 106048783 | 10/2016 |
| CN | 110170282 | 8/2019 |
| CN | 110184683 | 8/2019 |

OTHER PUBLICATIONS

Greenhalgh et al., Hybrid sol-gel inorganic/gelatin porous fibres via solution blow spinning, Mar. 2017, Journal of Material Science, vol. 52, pp. 9066-9081. (Year: 2017).*
(Continued)

*Primary Examiner* — Emmanuel S Luk
(74) *Attorney, Agent, or Firm* — Hodgson Russ LLP

(57) ABSTRACT

The present disclosure provides an anisotropic lamellar inorganic fiber aerogel material and a preparation method thereof. The method includes: mixing a polymer solution, an inorganic precursor and a chloride to obtain a spinning precursor solution; blow spinning the spinning precursor solution to obtain a composite fiber aerogel; calcinating the composite fiber aerogel to obtain the anisotropic lamellar inorganic fiber aerogel material. Therefore, the method has advantages of simplicity, easy operation, low cost, high efficiency and easy industrialized production. The inorganic fiber aerogel materials prepared by the above method are composed of multi-layer stacked fibers and have an anisotropic lamellar structure, which can be cut into any desired shape, and stacked to any desired thickness. In addition, the
(Continued)

inorganic fiber aerogel materials have good flexibility and compressibility, excellent fire resistance, good high and low temperature resistance and superior thermal insulation, which greatly expands their application field.

16 Claims, 2 Drawing Sheets

(51) Int. Cl.
    *B01J 13/00*     (2006.01)
    *C01B 33/20*     (2006.01)
    *C01G 25/00*     (2006.01)
    *C01G 49/00*     (2006.01)
    *D01D 5/14*     (2006.01)

(52) U.S. Cl.
    CPC ........... *C01G 49/0018* (2013.01); *D01D 5/14* (2013.01); *D01D 10/02* (2013.01); *C01P 2004/20* (2013.01); *C01P 2006/11* (2013.01); *C01P 2006/32* (2013.01)

(56) References Cited

U.S. PATENT DOCUMENTS

| | | | | |
|---|---|---|---|---|
| 8,225,641 | B2 * | 7/2012 | Wang | G01N 27/125 |
| | | | | 73/29.02 |
| 9,804,607 | B1 * | 10/2017 | Coleman | F28F 21/065 |
| 2006/0205852 | A1 * | 9/2006 | Tang | C08K 3/24 |
| | | | | 524/422 |
| 2009/0226732 | A1 * | 9/2009 | Anderson | B01D 39/2024 |
| | | | | 156/169 |
| 2010/0071356 | A1 * | 3/2010 | Tabata | B32B 5/26 |
| | | | | 55/385.3 |
| 2010/0323573 | A1 * | 12/2010 | Chu | B01D 69/141 |
| | | | | 977/773 |
| 2012/0171488 | A1 * | 7/2012 | Yeo | D01F 6/16 |
| | | | | 428/401 |
| 2013/0284668 | A1 * | 10/2013 | Miller | D21H 27/08 |
| | | | | 210/508 |
| 2013/0289171 | A1 * | 10/2013 | Miller | D06M 15/263 |
| | | | | 524/53 |
| 2014/0353882 | A1 * | 12/2014 | Joo | D01D 5/34 |
| | | | | 425/174.8 R |
| 2018/0044187 | A1 * | 2/2018 | Pico | D21H 13/40 |
| 2018/0313001 | A1 * | 11/2018 | Dempsey | D01F 6/06 |
| 2019/0209955 | A1 * | 7/2019 | Adlhart | B01D 39/1615 |

OTHER PUBLICATIONS

Roque-Ruiz et al., Fabrication of a-alumina fibers by sol-gel and electrospinning of aluminum nitrate precursor solutions, 2019, Results in Physics, vol. 12, pp. 193-204. (Year: 2019).*

Emig et al., Sol/gel-based precursors for manufacturing refactory oxide fibres, 1994, Jounal of Materials Science, vol. 29, pp. 4559-4566. (Year: 1994).*

SIPO, First Office Action for CN Application No. 201910376244.2, dated Mar. 5, 2020.

WIPO, ISR and WO for PCT/CN2020/085976, dated Jul. 20, 2020.

* cited by examiner

# ANISOTROPIC LAMELLAR INORGANIC FIBER AEROGEL MATERIALS AND PREPARATION METHOD THEREOF

CROSS-REFERENCE TO RELATED APPLICATIONS

This application is a U.S. national phase application of International Application No. PCT/CN2020/085976, filed Apr. 21, 2020, which claims priority to Chinese Patent Application No. 201910376244.2, filed May 7, 2019, the entire disclosure of which is incorporated herein by reference.

FIELD

The present disclosure relates to a field of materials, and more particularly to an anisotropic lamellar inorganic fiber aerogel material and a preparation method thereof.

BACKGROUND

In recent years, various aerogel materials, including carbon nanotube aerogels, biomass-derived aerogels, graphene aerogels, inorganic nanofiber aerogels, and carbon fiber aerogels, have received significant interest due to their high compressibility and resilience under large deformation, which results from their porous three-dimensional network structures. Among them, inorganic aerogel materials have attracted more interest due to their lightweight feature, high specific surface area, low thermal conductivity, and excellent chemical and thermal stability. By virtue of these characteristics, inorganic aerogel materials have been widely used in a variety of fields, including thermal insulation, water treatment, as catalyst carriers, for energy absorption, and for high temperature air filtration. However, traditional inorganic aerogel materials are usually prepared from inorganic oxides, such as silica nanoparticles, alumina nanolattices, and boron nitride sheets, and the inherent brittleness of inorganic materials severely limits their practical applications.

Therefore, it is of great significance to develop inorganic aerogel materials with excellent flexibility, high compressibility, as well as high and low temperature resistance.

SUMMARY

Embodiments of the present disclosure seek to solve at least one of the problems existing in the related technologies to at least some extent. Accordingly, an object of the present disclosure is to provide a method for preparing an anisotropic lamellar inorganic fiber aerogel material. The method has advantages of simplicity, easy operation, low cost and high efficiency, and the inorganic fiber aerogel material prepared by the method has good flexibility, high compressibility, as well as excellent high and low temperature resistance or thermal insulation.

According to one aspect of the present disclosure, a method for preparing an anisotropic lamellar inorganic fiber aerogel material is provided. According to embodiments of the present disclosure, the method includes: mixing a polymer solution, an inorganic precursor and a chloride to obtain a spinning precursor solution; blow spinning the spinning precursor solution to obtain a composite fiber aerogel; calcinating the composite fiber aerogel to obtain the anisotropic lamellar inorganic fiber aerogel material. Therefore, the method has advantages of simplicity, easy operation, low cost, high efficiency and easy industrialized production. The inorganic fiber aerogel materials prepared by the above-mentioned method are composed of multi-layer stacked fibers and have an anisotropic lamellar structure, which can be cut into any desired shape, and stacked to any desired thickness. Moreover, the prepared inorganic fiber aerogel materials have good flexibility and compressibility. In addition, the lamellar structure and inorganic components of the inorganic fiber aerogel materials endow them with excellent fire resistance, good high and low temperature resistance and superior thermal insulation, and thus their application field is greatly expanded.

According to embodiments of the present disclosure, the polymer solution includes a polymer material and a solvent, in which the mass ratio of the polymer material to the solvent is in a range of 2:100 to 30:100.

According to embodiments of the present disclosure, the spinning precursor solution further includes a catalyst.

According to embodiments of the present disclosure, the spinning precursor solution includes 2 to 30 parts by weight of the polymer material, 100 parts by weight of the solvent, 0.5 to 100 parts by weight of the inorganic precursor, 0.001 to 1 part by weight of the catalyst, and 1 to 100 parts by weight of the chloride.

According to embodiments of the present disclosure, the polymer material is selected from at least one of polyvinyl alcohol, polyethylene glycol, polyurethane, polyacrylic acid, polyvinyl pyrrolidone, cellulose acetate, methyl cellulose, carboxymethyl cellulose, polyvinylidene fluoride, polymethyl methacrylate, polyacrylamide, polyethylene oxide, polylactic acid, polyamide, polycaprolactone, polyvinyl butyral, polyaniline, polyimide and polycarbonate.

Optionally, the solvent is selected from at least one of water, formic acid, tetrahydrofuran, acetone, butanone, n-hexane, cyclohexane, n-heptane, acetonitrile, N-methylpyrrolidone, 1,2-propanediol, chloroform, dichloromethane, 1,2-dichloroethane, methanol, ethanol, isopropanol, tert-butanol, n-butanol, toluene, xylene, ethylenediamine, dimethyl sulfoxide, N,N-dimethylformamide, N,N-dimethylacetamide and carbon tetrachloride.

Optionally, the inorganic precursor is selected from at least one of zirconium oxychloride, zirconium acetate, aluminum isopropoxide, zirconium n-propoxide, tetraethyl orthosilicate, and tetramethyl orthosilicate.

Optionally, the catalyst is selected from at least one of phosphoric acid, sulphuric acid, hydrochloric acid, nitric acid, formic acid, acetic acid, hydrofluoric acid, perchloric acid, trifluoroacetic acid, citric acid, oxalic acid and maleic acid.

According to embodiments of the present disclosure, the chloride is selected from at least one of lithium chloride, sodium chloride, potassium chloride, rubidium chloride, cesium chloride, beryllium chloride, magnesium chloride, calcium chloride, strontium chloride, barium chloride, radium chloride, zinc chloride, copper chloride, nickel chloride, cobalt chloride, iron chloride, ferrous chloride, manganese chloride, chromic chloride, vanadium chloride, titanium tetrachloride, scandium chloride, aluminum chloride, gallium chloride, indium chloride, thallium chloride, tin chloride, lead chloride, cadmium chloride, palladium chloride, rhodium chloride, ruthenium chloride, zirconium chloride, hafnium chloride, osmium trichloride, platinum chloride, gold chloride and mercuric chloride.

According to embodiments of the present disclosure, compressed air is used to blow the spinning precursor solution from a spinneret of a blow spinning device, and in blow spinning, the extrusion speed of the spinning precursor solution is in a range of 0.1 to 15 mL/h, the distance between the spinneret and a receiver is in a range of 20 to 100 cm, and the flow rate of the compressed air is in a range of 1 to 50 m/s.

According to embodiments of the present disclosure, the calcination temperature is in a range of 500° C. to 2000° C. at a heating rate of 0.1 to 10° C./min, maintained for a time period of 0 to 24 h, and cooled down to room temperature.

According to another aspect of the present disclosure, an anisotropic lamellar inorganic fiber aerogel material is provided. According to embodiments of the present disclosure, the anisotropic lamellar inorganic fiber aerogel materials are prepared by the above-mentioned method. Therefore, the inorganic fiber aerogel materials are composed of multi-layer stacked fibers and have an anisotropic lamellar structure, which can be cut into any desired shape, and stacked to any desired thickness. In addition, the inorganic fiber aerogel materials have good flexibility and compressibility. Furthermore, the lamellar structure and inorganic components of the inorganic fiber aerogel materials endow them with excellent fire resistance, good high and low temperature resistance and superior thermal insulation, and thus their application field is greatly expanded.

According to embodiments of the present disclosure, the bulk density of the inorganic fiber aerogel material is in a range of 5 to 200 mg/cm$^3$, optionally, the average diameter of inorganic fibers in the inorganic fiber aerogel material is in a range of 0.2 to 10 μm.

DETAILED DESCRIPTION

Embodiments of the present disclosure are described in detail below. The embodiments described herein with reference to drawings are explanatory, and used to generally understand the present disclosure. The embodiments shall not be construed to limit the present disclosure. The specific techniques and conditions in the following embodiments which do not indicate are usually in accordance with the conventional techniques and conditions in this field, or the product instructions. The reagents or instruments used without the manufacturers' indication are all conventional products that are commercially available.

Figure 1:
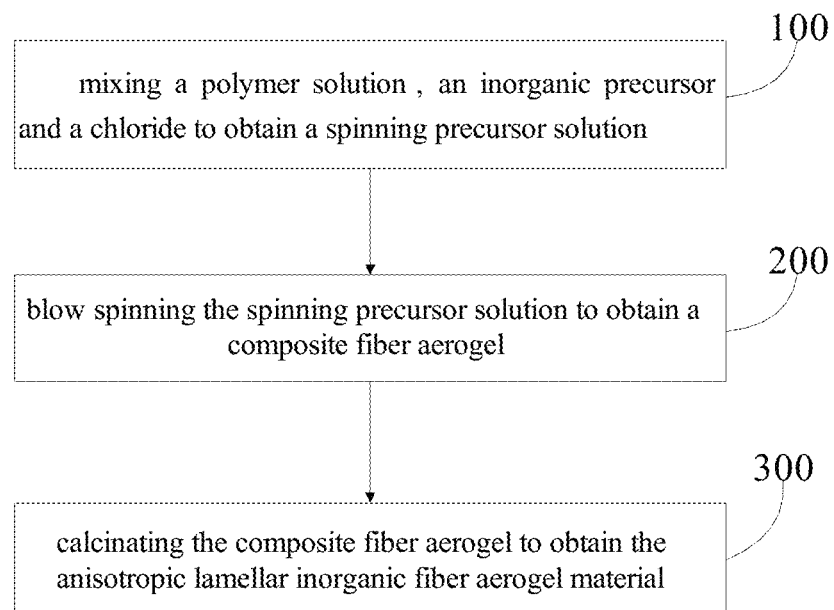
FIG. 1 is a flow chart of a method for preparing an anisotropic lamellar inorganic fiber aerogel material in an embodiment of the present disclosure.

According to one aspect of the present disclosure, a method for preparing an anisotropic lamellar inorganic fiber aerogel material (herein also referred to in brief as inorganic fiber aerogel material) is provided. According to embodiments of the present disclosure with reference to FIG. 1, the method for preparing the anisotropic lamellar inorganic fiber aerogel material includes steps 100 to 300 as follows.

In step 100, a polymer solution, an inorganic precursor and a chloride are mixed to obtain a spinning precursor solution. In this process, the inorganic precursor is hydrolyzed to obtain an inorganic oxide, thus subsequently obtaining an inorganic fiber aerogel material.

According to embodiments of the present disclosure, the polymer solution includes a polymer material and a solvent, in which the mass ratio of the polymer material to the solvent is in a range of 2:100 to 30:100, e.g., 2:100, 5:100, 8:100, 10:100, 15:100, 20:100, 25:100, or 30:100. Therefore, a homogeneous polymer solution can be obtained, and the polymer solution at the above concentration is beneficial to the subsequent blow spinning to obtain an inorganic fiber aerogel material with excellent compressibility and flexibility. If the mass ratio of the polymer material to the solvent is less than 2:100, the concentration of the polymer solution is too low to form fibers. If the mass ratio of the polymer material to the solvent is higher than 30:100, the polymer material is not easy to dissolve completely, and the viscosity of the polymer solution is too high, such that it is difficult to blow the polymer solution from a spinneret of a blow spinning device to form fibers.

According to embodiments of the present disclosure, in order to obtain a sufficiently dissolved polymer solution, the procedure for preparing the polymer solution includes: adding a certain amount of polymer material to a certain amount of solvent, followed by stirring and dissolving at room temperature (25° C.) to 100° C. at a stirring speed of 50 to 1000 rpm for 0.1 to 10 h, such that a polymer solution with a suitable concentration can be obtained. Herein, the specific amount of the polymer material and the solvent as well as specific process conditions can be determined by those skilled in the art based on the specific polymer material and the selected solvent. There are no limitations here, as long as the polymer material can be fully and quickly dissolved. Herein, the stirring can be performed by mechanical stirring or magnetic stirring.

According to embodiments of the present disclosure, the polymer material is selected from at least one of polyvinyl alcohol, polyethylene glycol, polyurethane, polyacrylic acid, polyvinyl pyrrolidone, cellulose acetate, methyl cellulose, carboxymethyl cellulose, polyvinylidene fluoride, polymethyl methacrylate, polyacrylamide, polyethylene oxide, polylactic acid, polyamide, polycaprolactone, polyvinyl butyral, polyaniline, polyimide and polycarbonate. Therefore, the polymer material is widely available, easy to spin, and easy to remove in the subsequent calcination.

According to embodiments of the present disclosure, the solvent is selected from at least one of water, formic acid, tetrahydrofuran, acetone, butanone, n-hexane, cyclohexane, n-heptane, acetonitrile, N-methylpyrrolidone, 1,2-propanediol, chloroform, dichloromethane, 1,2-dichloroethane, methanol, ethanol, isopropanol, tert-butanol, n-butanol, toluene, xylene, ethylenediamine, dimethyl sulfoxide, N,N-dimethylformamide, N,N-dimethylacetamide and carbon tetrachloride. Therefore, those skilled in the art can select suitable solvents according to different polymer materials to dissolve the polymer materials quickly and effectively.

According to embodiments of the present disclosure, the inorganic precursor is selected from at least one of zirconium oxychloride, zirconium acetate, aluminum isopropoxide, zirconium n-propoxide, tetraethyl orthosilicate, and tetramethyl orthosilicate. Therefore, the above-mentioned inorganic precursors can be hydrolyzed to obtain oxides (such as zirconia, alumina and silica), followed by blow spinning to obtain inorganic fiber aerogel materials.

According to embodiments of the present disclosure, in order to obtain the inorganic fiber aerogel materials with a lamellar structure, the chloride is selected from at least one of lithium chloride, sodium chloride, potassium chloride, rubidium chloride, cesium chloride, beryllium chloride, magnesium chloride, calcium chloride, strontium chloride, barium chloride, radium chloride, zinc chloride, copper chloride, nickel chloride, cobalt chloride, iron chloride, ferrous chloride, manganese chloride, chromic chloride, vanadium chloride, titanium tetrachloride, scandium chloride, aluminum chloride, gallium chloride, indium chloride, thallium chloride, tin chloride, lead chloride, cadmium chloride, palladium chloride, rhodium chloride, ruthenium chloride, zirconium chloride, hafnium chloride, osmium trichloride, platinum chloride, gold chloride and mercuric chloride. Therefore, in blow spinning, under the action of the chloride, the inorganic fiber aerogel materials with a lamellar structure can be obtained, which greatly improves the compressibility of the inorganic fiber aerogel materials.

According to embodiments of the present disclosure, in order to promote the hydrolysis of the inorganic precursor, the spinning precursor solution further comprises a catalyst. In an embodiment of the present disclosure, the catalyst is selected from at least one of phosphoric acid, sulphuric acid, hydrochloric acid, nitric acid, formic acid, acetic acid, hydrofluoric acid, perchloric acid, trifluoroacetic acid, citric acid, oxalic acid and maleic acid. Therefore, under the action of the above-mentioned catalyst, the inorganic precursor can be hydrolyzed into an inorganic oxide quickly, effectively, and more fully, such that the inorganic fiber aerogel materials with excellent properties can be obtained in subsequent steps.

According to embodiments of the present disclosure, the specific process of mixing above-mentioned reagents and components can be flexibly determined by those skilled in the art according to actual needs. In some embodiments of the present disclosure, the inorganic precursor, the catalyst and the chloride are respectively added to the polymer solution, followed by stirring to obtain a spinning precursor solution with a certain viscosity. In other embodiments of the present disclosure, the inorganic precursor, the catalyst and the chloride are mixed, and then the resulting mixture is added to the polymer solution, followed by stirring to obtain a spinning precursor solution with a certain viscosity. Herein, the specific process of stirring is not particularly limited, and the stirring can be performed by mechanical stirring or magnetic stirring.

According to embodiments of the present disclosure, in order to obtain an inorganic fiber aerogel material with better properties, the spinning precursor solution includes 2 to 30 parts by weight of the polymer material, 100 parts by weight of the solvent, 0.5 to 100 parts by weight of the inorganic precursor, 0.001 to 1 part by weight of the catalyst, and 1 to 100 parts by weight of the chloride. Therefore, the inorganic fiber aerogel materials prepared with the above component ratios have good compressibility and flexibility, as well as an anisotropic lamellar structure. The addition of chloride can effectively ensure the lamellar structure of the inorganic fiber aerogel materials. If the amount of the chloride is too low, the lamellar structure of the inorganic fiber aerogel materials is not obvious, which leads to a relatively poor compressibility. If the amount of the chloride is too high, the compressibility of the inorganic fiber aerogel materials is also deteriorated.

In step 200, the spinning precursor solution is blow spun to obtain a composite fiber aerogel. In this process, under the action of the chloride, the obtained composite fiber aerogels have a multi-layer stacked lamellar structure, and thus has anisotropy, such that the finally obtained inorganic fiber aerogel materials can be cut into any desired shape, and stacked to any desired thickness. Herein, "anisotropy" means that the compressibility and recovery performance of the inorganic fiber aerogel materials are different, when the inorganic fiber aerogel materials are compressed from different directions relative to the inorganic fiber layer in the inorganic fiber aerogel materials. For example, the inorganic fiber aerogel materials can completely return to their original shape when they are compressed from a direction perpendicular to the inorganic fiber layer (refer to FIG. 2). However, the inorganic fiber aerogel materials cannot recover to their original shape when they are compressed from a direction parallel to the inorganic fiber layer (refer to FIG. 3).

According to embodiments of the present disclosure, by blow spinning, the spinning precursor solution is spun, and compressed air is used to blow the spinning precursor solution from a spinneret of a blow spinning device. Specifically, blow spinning is performed using a pair of coaxial nozzles, i.e. inner and outer nozzles, particularly, the spinning precursor solution is ejected from the inner nozzle by using compressed air, and a high-speed airflow is ejected through the outer nozzle, and then the spinning precursor solution forms a polymer jet under the shear effect of the high-speed airflow. The polymer jet is further split, stretched, and refined before reaching a receiving device. At the same time, the solvent continuously volatilizes, such that fibers are formed, solidified and collected on the receiving device (also called receiver). Compared with electrospinning, the blow spinning device is simple, uses the high-speed airflow as a driving force without a high-voltage electrostatic field, and has higher spinning efficiency, and the composite fiber aerogels can be deposited on any substrate. Therefore, it is of great significance to use a blow spinning technology to prepare inorganic fiber aerogel materials with high compressibility and excellent high temperature resistance on a large scale.

According to embodiments of the present disclosure, the specific type of the receiving device can be flexibly selected by those skilled in the art according to actual needs. In some embodiments of the present disclosure, the receiving device includes, but is not limited to a metal mesh, a plastic mesh and a non-woven fabric.

According to embodiments of the present disclosure, in order to obtain an inorganic fiber aerogel material with excellent compressibility and flexibility, in blow spinning, the extrusion speed of the spinning precursor solution is in a range of 0.1 to 15 mL/h (e.g., 0.1 mL/h, 0.5 mL/h, 1 mL/h, 2 mL/h, 3 mL/h, 4 mL/h, 5 mL/h, 6 mL/h, 7 mL/h, 8 mL/h, 9 mL/h, 10 mL/h, 11 mL/h, 12 mL/h, 13 mL/h, 14 mL/h, or 15 mL/h), the distance between the spinneret and a receiver is in a range of 20 to 100 cm (e.g., 20 cm, 30 cm, 40 cm, 50 cm, 60 cm, 70 cm, 80 cm, 90 cm, or 100 cm), and the flow rate of the compressed air is in a range of 1 to 50 m/s (e.g., 1 m/s, 5 m/s, 10 m/s, 15 m/s, 20 m/s, 25 m/s, 30 m/s, 35 m/s, 40 m/s, 45 m/s, or 50 m/s). Therefore, an inorganic fiber aerogel material with excellent properties can be prepared.

In step 300, the composite fiber aerogel is calcinated to obtain the anisotropic lamellar inorganic fiber aerogel material. In this process, by calcination, the polymer material is decomposed into small molecules such as carbon dioxide and water, and is removed to obtain the inorganic fiber aerogel materials, such that the lamellar inorganic fiber aerogel materials have excellent fire resistance, good high and low temperature resistance (the inorganic fiber aerogel materials can maintain good compressibility after treatment at −196° C. and 1000° C. for 24 h, respectively), and excellent thermal insulation properties (the thermal conductivity of the inorganic fiber aerogel materials is as low as 0.034 W/m K).

According to embodiments of the present disclosure, in order to fully decompose the polymer material, the calcination temperature is in a range of 500° C. to 2000° C. (e.g., 500° C., 800° C., 1000° C., 1300° C., 1500° C., 1800° C. or 2000° C.) at a heating rate of 0.1 to 10° C./min, maintained for a time period of 0 to 24 h (e.g., 1 h, 5 h, 8 h, 10 h, 14 h, 18 h, 20 h or 24 h), and then cooled down to room temperature. The specific parameters in the calcination process can be flexibly set by those skilled in the art according to actual needs.

According to embodiments of the present disclosure, the above-mentioned method for preparing inorganic fiber aerogel materials has advantages of simplicity, easy operation, low cost, high efficiency and easy industrialized production. The inorganic fiber aerogel materials prepared by the above-mentioned method are composed of multi-layer stacked fibers and have an anisotropic lamellar structure, and they can be cut into any desired shape, and stacked to any desired thickness. Moreover, the inorganic fiber aerogel materials have good flexibility and compressibility. In addition, the lamellar structure and inorganic components of the inorganic fiber aerogel materials endow them with excellent fire resistance, good high and low temperature resistance and superior thermal insulation, and thus their application field is greatly expanded.

Figure 2:
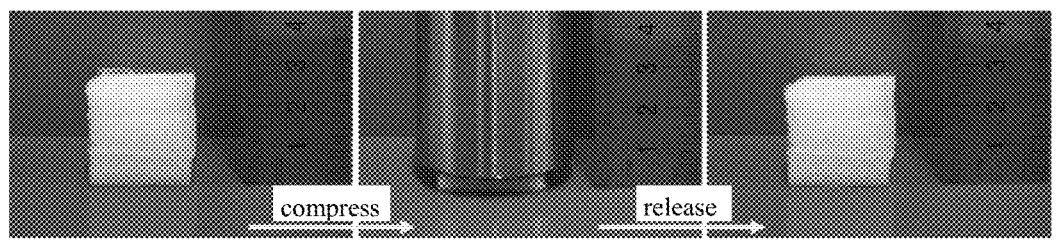
FIG. 2 is a digital image of a compressed anisotropic lamellar inorganic fiber aerogel material in another embodiment of the present disclosure.
Figure 3:
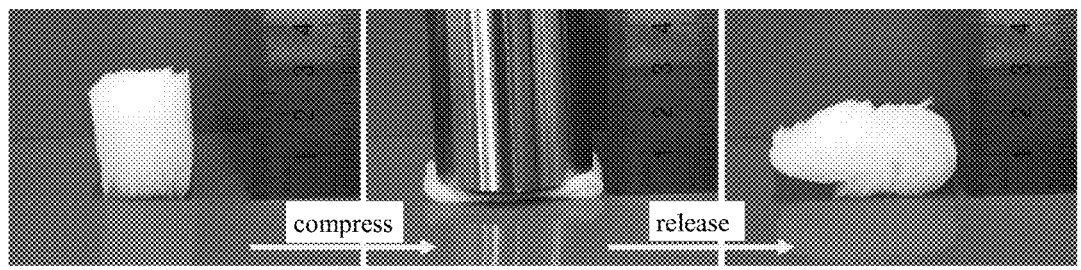
FIG. 3 is a digital image of a compressed anisotropic lamellar inorganic fiber aerogel material in another embodiment of the present disclosure.
Figure 4:
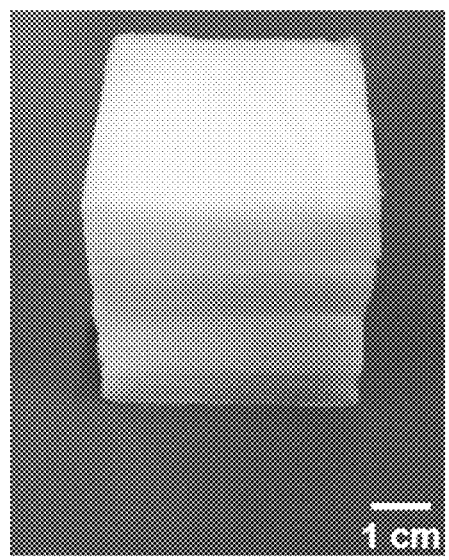
FIG. 4 is a digital image of an anisotropic lamellar inorganic fiber aerogel material in another embodiment of the present disclosure.
Figure 5:
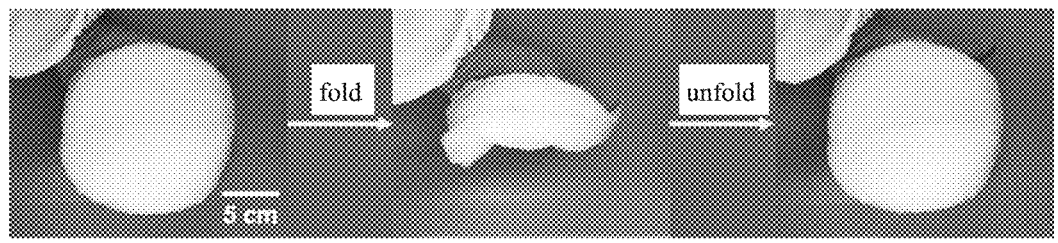
FIG. 5 is a digital image of a compressed anisotropic lamellar inorganic fiber aerogel material in another embodiment of the present disclosure.
Figure 6:
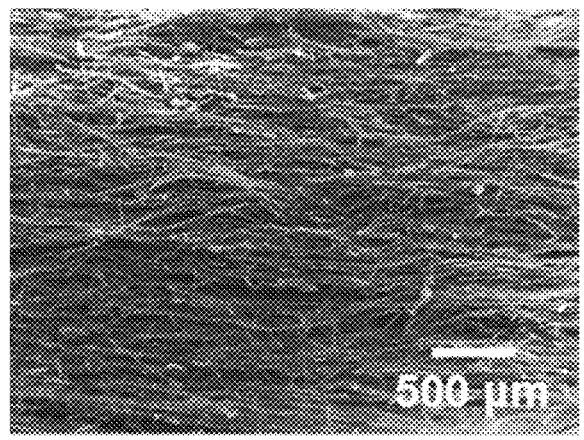
FIG. 6 is a SEM (scanning electron microscope) image of an anisotropic lamellar inorganic fiber aerogel material in another embodiment of the present disclosure.

In some embodiments of the present disclosure, the prepared inorganic fiber aerogel materials are shown in FIG. 2, FIG. 3, FIG. 4 and FIG. 5, and a scanning electron micrograph (SEM) of the inorganic fiber aerogel material is shown in FIG. 6. The inorganic fiber aerogel materials have good compressibility and flexibility (FIG. 2 and FIG. 5). The inorganic fiber aerogel materials have excellent fire resistance, good high and low temperature resistance (the inorganic fiber aerogel materials can maintain good compressibility after treatment at −196° C. and 1000° C. for 24 h, respectively), and superior thermal insulation properties (the thermal conductivity of the inorganic fiber aerogel materials is as low as 0.034 W/m K).

According to another aspect of the present disclosure, an anisotropic lamellar inorganic fiber aerogel material is provided. According to embodiments of the present disclosure, the anisotropic lamellar inorganic fiber aerogel materials are prepared by the above-mentioned method. Therefore, the inorganic fiber aerogel materials are composed of multi-layer stacked fibers and have an anisotropic lamellar structure, which can be cut into any desired shape, and stacked to any desired thickness. In addition, the inorganic fiber aerogel materials have good flexibility and compressibility. Furthermore, the lamellar structure and inorganic components of the inorganic fiber aerogel materials endow them with excellent fire resistance, good high and low temperature resistance and superior thermal insulation, and thus their application field is greatly expanded.

According to embodiments of the present disclosure, the bulk density of the inorganic fiber aerogel materials is in a range of 5 to 200 mg/cm$^3$ (e.g., 5 mg/cm$^3$, 25 mg/cm$^3$, 50 mg/cm$^3$, 75 mg/cm$^3$, 100 mg/cm$^3$, 125 mg/cm$^3$, 150 mg/cm$^3$, 175 mg/cm$^3$, or 200 mg/cm$^3$), and the average diameter of inorganic fibers in the inorganic fiber aerogel materials is in a range of 0.2 to 10 μm (e.g., 0.2 μm, 0.5 μm, 1 μm, 2 μm, 4 μm, 6 μm, 8 μm or 10 μm). Therefore, the bulk density of the inorganic fiber aerogel materials and the diameter of inorganic fibers are in wide range, such that the inorganic fiber aerogel materials with different bulk densities and fiber diameters can be prepared by those skilled in the art according to different needs and applications, thus meeting different market requirements.

EXAMPLES

Example 1

A method for preparing an anisotropic lamellar inorganic fiber aerogel material includes the following procedures:

(1) Preparation of Polymer Solution 20 g of polyvinyl alcohol was added to 100 g of deionized water, followed by stirring and dissolving at a stirring speed of 800 rpm at 90° C. for 1 h to obtain a polyvinyl alcohol solution with a mass ratio of the polymer material to the solvent of 20:100.

(2) Preparation of Spinning Precursor Solution 50 g of zirconium oxychloride, 0.2 g of hydrochloric acid and 40 g of iron chloride were added to the above-mentioned polyvinyl alcohol solution, followed by stirring to obtain a spinning precursor solution with a certain viscosity.

(3) Blow Spinning

The spinning precursor solution was ejected from a spinneret at a speed of 5 mL/h using compressed air with a flow rate of 5 m/s. The resulting fibers were deposited on a metal mesh receiver at a distance of 60 cm from the spinneret, and the composite fiber aerogel was obtained.

(4) Calcination

The obtained composite fiber aerogel was heated from room temperature to 1000° C. at a heating rate of 5° C./min and maintained for 1 h, and then cooled down to room temperature to obtain an anisotropic lamellar inorganic fiber aerogel material.

The obtained anisotropic lamellar inorganic fiber aerogel material has a bulk density of 15 mg/cm$^3$, a thermal conductivity of 0.037 W/m K at room temperature and an average fiber diameter of 2.5 μm.

Example 2

A method for preparing an anisotropic lamellar inorganic fiber aerogel material includes the following procedures:

(1) Preparation of Polymer Solution 5 g of polyethylene oxide was added to 100 g of deionized water, followed by stirring and dissolving at a stirring speed of 800 rpm at 60° C. for 1 h to obtain a polyethylene oxide solution with a mass ratio of the polymer material to the solvent of 5:100.

(2) Preparation of Spinning Precursor Solution 40 g of tetraethyl orthosilicate, 0.2 g of phosphoric acid and 30 g of manganese chloride were added to the above-mentioned polyethylene oxide solution, followed by stirring to obtain a spinning precursor solution with a certain viscosity.

(3) Blow Spinning

The spinning precursor solution was ejected from a spinneret at a speed of 5 mL/h using compressed air with a flow rate of 3 m/s. The resulting fibers were deposited on a metal mesh receiver at a distance of 60 cm from the spinneret, and the composite fiber aerogel was obtained.

(4) Calcination

The obtained composite fiber aerogel was heated from room temperature to 1100° C. at a heating rate of 5° C./min and maintained for 1 h, and then cooled down to room temperature to obtain an anisotropic lamellar inorganic fiber aerogel material.

The obtained anisotropic lamellar inorganic fiber aerogel material has a bulk density of 19 mg/cm$^3$, a thermal conductivity of 0.038 W/m K at room temperature and an average fiber diameter of 2.4 μm.

Example 3

A method for preparing an anisotropic lamellar inorganic fiber aerogel material includes the following procedures:

(1) Preparation of Polymer Solution 12 g of polyvinyl alcohol was added to 100 g of deionized water, followed by stirring and dissolving at a stirring speed of 800 rpm at 80° C. for 1 h to obtain a polyvinyl alcohol solution with a mass ratio of the polymer material to the solvent of 12:100.

(2) Preparation of Spinning Precursor Solution 40 g of tetraethyl orthosilicate, 0.1 g of phosphoric acid and 35 g of aluminum chloride were added to the above-mentioned polyvinyl alcohol solution, followed by stirring to obtain a spinning precursor solution with a certain viscosity.

(3) Blow Spinning

The spinning precursor solution was ejected from a spinneret at a speed of 5 mL/h using compressed air with a flow rate of 5 m/s. The resulting fibers were deposited on a metal mesh receiver at a distance of 60 cm from the spinneret, and the composite fiber aerogel was obtained.

(4) Calcination

The obtained composite fiber aerogel was heated from room temperature to 1000° C. at a heating rate of 5° C./min and maintained for 1 h, and then cooled down to room temperature to obtain an anisotropic lamellar inorganic fiber aerogel material.

The obtained anisotropic lamellar inorganic fiber aerogel material has a bulk density of 21 mg/cm$^3$, a thermal conductivity of 0.035 W/m K at room temperature and an average fiber diameter of 2.7 μm.

Example 4

A method for preparing an anisotropic lamellar inorganic fiber aerogel material includes the following procedures:

(1) Preparation of Polymer Solution 4 g of carboxymethyl cellulose was added to 100 g of deionized water, followed by stirring and dissolving at a stirring speed of 900 rpm at 40° C. for 2 h to obtain a carboxymethyl cellulose solution with a mass ratio of the polymer material to the solvent of 4:100.

(2) Preparation of Spinning Precursor Solution 40 g of zirconium acetate, 0.01 g of phosphoric acid and 30 g of magnesium chloride were added to the above-mentioned carboxymethyl cellulose solution, followed by stirring to obtain a spinning precursor solution with a certain viscosity.

(3) Blow Spinning

The spinning precursor solution was ejected from a spinneret at a speed of 5 mL/h using compressed air with a flow rate of 5 m/s. The resulting fibers were deposited on a metal mesh receiver at a distance of 60 cm from the spinneret, and the composite fiber aerogel was obtained.

(4) Calcination

The obtained composite fiber aerogel was heated from room temperature to 1100° C. at a heating rate of 5° C./min and maintained for 1 h, and then cooled down to room temperature to obtain an anisotropic lamellar inorganic fiber aerogel material.

The obtained anisotropic lamellar inorganic fiber aerogel material has a bulk density of 20 mg/cm$^3$, a thermal conductivity of 0.034 W/m K at room temperature and an average fiber diameter of 2.6 μm.

Example 5

A method for preparing an anisotropic lamellar inorganic fiber aerogel material includes the following procedures:

(1) Preparation of Polymer Solution 15 g of polyvinyl pyrrolidone was added to 100 g of deionized water, followed by stirring and dissolving at a stirring speed of 800 rpm at 70° C. for 1 h to obtain a polyvinyl pyrrolidone solution with a mass ratio of the polymer material to the solvent of 15:100.

(2) Preparation of Spinning Precursor Solution 50 g of zirconium oxychloride, 0.01 g of sulphuric acid and 30 g of tin chloride were added to the above-mentioned polyvinyl pyrrolidone solution, followed by stirring to obtain a spinning precursor solution with a certain viscosity.

(3) Blow Spinning

The spinning precursor solution was ejected from a spinneret at a speed of 5 mL/h using compressed air with a flow rate of 5 m/s. The resulting fibers were deposited on a metal mesh receiver at a distance of 60 cm from the spinneret, and the composite fiber aerogel was obtained.

(4) Calcination

The obtained composite fiber aerogel was heated from room temperature to 1000° C. at a heating rate of 5° C./min and maintained for 1 h, and then cooled down to room temperature to obtain an anisotropic lamellar inorganic fiber aerogel material.

The obtained anisotropic lamellar inorganic fiber aerogel material has a bulk density of 25 mg/cm$^3$, a thermal conductivity of 0.037 W/m K at room temperature and an average fiber diameter of 2.1 μm.

Reference throughout this specification to "an embodiment", "some embodiments", "an example", "a specific example", or "some examples" means that a particular feature, structure, material, or characteristic described in connection with the embodiment or example is included in at least one embodiment or example of the present disclosure. Thus, the appearances of the phrases in different places throughout this specification are not necessarily referring to the same embodiment or example of the present disclosure. Furthermore, the particular features, structures, materials, or characteristics may be combined in any suitable manner in one or more embodiments or examples. In addition, those skilled in the art can combine the different embodiments or examples and the features described in this specification without being mutually inconsistent.

Although explanatory embodiments have been shown and described, it would be appreciated by those skilled in the art that the above embodiments cannot be construed to limit the present disclosure, and changes, alternatives, and modifications can be made in the embodiments without departing from the spirit, principles and scope of the present disclosure.

What is claimed is:

1. A method for preparing an anisotropic lamellar inorganic fiber aerogel material, comprising:
   mixing a polymer solution, an inorganic precursor and a chloride to obtain a spinning precursor solution;
   blow spinning the spinning precursor solution to obtain a composite fiber aerogel; and
   calcinating the composite fiber aerogel to obtain the anisotropic lamellar inorganic fiber aerogel material.

2. The method according to claim 1, wherein the polymer solution comprises polymer material and a solvent, wherein a mass ratio of the polymer material to the solvent is in a range of 2:100 to 30:100.

3. The method according to claim 2, wherein the mass ratio of the polymer material to the solvent is in a range of 4:100 to 20:100.

4. The method according to claim 1, wherein the spinning precursor solution further comprises a catalyst.

5. The method according to claim 4, wherein the spinning precursor solution comprises:
   2 to 30 parts by weight of the polymer material;
   100 parts by weight of the solvent;
   0.5 to 100 parts by weight of the inorganic precursor;
   0.001 to 1 part by weight of the catalyst; and
   1 to 100 parts by weight of the chloride.

6. The method according to claim 4, wherein the polymer material is selected from at least one of polyvinyl alcohol, polyethylene glycol, polyurethane, polyacrylic acid, polyvinyl pyrrolidone, cellulose acetate, methyl cellulose, carboxymethyl cellulose, polyvinylidene fluoride, polymethyl methacrylate, polyacrylamide, polyethylene oxide, polylactic acid, polyamide, polycaprolactone, polyvinyl butyral, polyaniline, polyimide and polycarbonate;
   optionally, the solvent is selected from at least one of water, formic acid, tetrahydrofuran, acetone, butanone, n-hexane, cyclohexane, n-heptane, acetonitrile, N-methylpyrrolidone, 1,2-propanediol, chloroform, dichloromethane, 1,2-dichloroethane, methanol, ethanol, isopropanol, tert-butanol, n-butanol, toluene, xylene, ethylenediamine, dimethyl sulfoxide, N,N-dimethylformamide, N,N-dimethylacetamide and carbon tetrachloride;
   optionally, the inorganic precursor is selected from at least one of zirconium oxychloride, zirconium acetate, aluminum isopropoxide, zirconium n-propoxide, tetraethyl orthosilicate, and tetramethyl orthosilicate;
   optionally, the catalyst is selected from at least one of phosphoric acid, sulphuric acid, hydrochloric acid, nitric acid, formic acid, acetic acid, hydrofluoric acid, perchloric acid, trifluoroacetic acid, citric acid, oxalic acid and maleic acid.

7. The method according to claim 4, wherein the chloride is selected from at least one of lithium chloride, sodium chloride, potassium chloride, rubidium chloride, cesium chloride, beryllium chloride, magnesium chloride, calcium chloride, strontium chloride, barium chloride, radium chloride, zinc chloride, copper chloride, nickel chloride, cobalt chloride, iron chloride, ferrous chloride, manganese chloride, chromic chloride, vanadium chloride, titanium tetrachloride, scandium chloride, aluminum chloride, gallium chloride, indium chloride, thallium chloride, tin chloride, lead chloride, cadmium chloride, palladium chloride, rhodium chloride, ruthenium chloride, zirconium chloride, hafnium chloride, osmium trichloride, platinum chloride, gold chloride and mercuric chloride.

8. The method according to claim 4, wherein compressed air is used to blow the spinning precursor solution from a spinneret of a blow spinning device, and in blow spinning, an extrusion speed of the spinning precursor solution is in a range of 0.1 to 15 mL/h, a distance between the spinneret and a receiver is in a range of 20 to 100 cm, and a flow rate of the compressed air is in a range of 1 to 50 m/s.

9. The method according to claim 8, wherein in blow spinning, the extrusion speed of the spinning precursor solution is in a range of 1 to 5 mL/h, the distance between the spinneret and the receiver is in a range of 30 to 60 cm, and the flow rate of the compressed air is in a range of 3 to 5 m/s.

10. The method according to claim 4, wherein a calcination temperature is in a range of 500° C. to 2000° C. at a heating rate of 0.1 to 10° C./min, maintained for a time period of 0 to 24 h, and cooled down to room temperature.

11. The method according to claim 10, wherein the calcination temperature is in a range of 800° C. to 1100° C. at a heating rate of 5° C./min, maintained for a time period of 1 to 5 h, and cooled down to room temperature.

12. The method according to claim 1, wherein the chloride is selected from at least one of lithium chloride, sodium chloride, potassium chloride, rubidium chloride, cesium chloride, beryllium chloride, magnesium chloride, calcium chloride, strontium chloride, barium chloride, radium chloride, zinc chloride, copper chloride, nickel chloride, cobalt chloride, iron chloride, ferrous chloride, manganese chloride, chromic chloride, vanadium chloride, titanium tetrachloride, scandium chloride, aluminum chloride, gallium chloride, indium chloride, thallium chloride, tin chloride, lead chloride, cadmium chloride, palladium chloride, rhodium chloride, ruthenium chloride, zirconium chloride, hafnium chloride, osmium trichloride, platinum chloride, gold chloride and mercuric chloride.

13. The method according to claim 1, wherein compressed air is used to blow the spinning precursor solution from a spinneret of a blow spinning device, and in blow spinning, an extrusion speed of the spinning precursor solution is in a range of 0.1 to 15 mL/h, a distance between the spinneret and a receiver is in a range of 20 to 100 cm, and a flow rate of the compressed air is in a range of 1 to 50 m/s.

14. The method according to claim 13, wherein in blow spinning, the extrusion speed of the spinning precursor solution is in a range of 1 to 5 mL/h, the distance between the spinneret and the receiver is in a range of 30 to 60 cm, and the flow rate of the compressed air is in a range of 3 to 5 m/s.

15. The method according to claim 1, wherein a calcination temperature is in a range of 500° C. to 2000° C. at a heating rate of 0.1 to 10° C./min, maintained for a time period of 0 to 24 h, and cooled down to room temperature.

16. The method according to claim 15, wherein the calcination temperature is in a range of 800° C. to 1100° C. at a heating rate of 5° C./min, maintained for a time period of 1 to 5 h, and cooled down to room temperature.

* * * * *